United States Patent
Holzlöhner et al.

(10) Patent No.: US 12,334,799 B2
(45) Date of Patent: Jun. 17, 2025

(54) VENTED ELECTRIC DRIVE UNIT FOR A VEHICLE

(71) Applicant: ZF Friedrichshafen AG, Friedrichshafen (DE)

(72) Inventors: Andreas Holzlöhner, Langenargen (DE); Vyacheslav Brushkivskyy, Kressbronn (DE); Marcel Neurohr, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 334 days.

(21) Appl. No.: 17/855,341

(22) Filed: Jun. 30, 2022

(65) Prior Publication Data

US 2023/0024621 A1    Jan. 26, 2023

(30) Foreign Application Priority Data

Jul. 20, 2021   (DE) .................... 10 2021 207 712.9

(51) Int. Cl.
*H02K 5/20*     (2006.01)
*B60K 1/00*     (2006.01)
*H02K 9/19*     (2006.01)

(52) U.S. Cl.
CPC ................. *H02K 9/19* (2013.01); *B60K 1/00* (2013.01); *H02K 5/203* (2021.01); *B60K 2001/006* (2013.01)

(58) Field of Classification Search
CPC ............ H02K 5/20; H02K 5/203; H02K 9/19; H02K 9/193; H02K 2205/09; B60K 2001/003; B60K 2001/006; B60K 1/00
See application file for complete search history.

(56) References Cited

U.S. PATENT DOCUMENTS

| | | |
|---|---|---|
| 2,272,926 A | 2/1942 | Squiller |
| 7,884,511 B2 | 2/2011 | Mogi et al. |
| 7,980,343 B2 | 7/2011 | Mogi |
| 8,678,784 B2 | 3/2014 | Atarashi et al. |
| 9,502,943 B2 | 11/2016 | Koeneman et al. |

(Continued)

FOREIGN PATENT DOCUMENTS

| | | |
|---|---|---|
| DE | 44 10 984 | 2/1995 |
| DE | 103 06 896 | 8/2004 |

(Continued)

OTHER PUBLICATIONS

Mattes et al., Machine Translation of DE102019122617, Feb. 2021 (Year: 2021).*

(Continued)

*Primary Examiner* — Eric Johnson
(74) *Attorney, Agent, or Firm* — Finch & Maloney PLLC

(57) ABSTRACT

Disclosed is a drive unit (1) comprising a housing (2), an electric motor (3) disposed inside the housing, and at least one oil chamber (15) which is disposed in the housing (2). The oil chamber (15) comprises an oil region (21) and an air region (22) and is closed off to the outside by a housing cover (35). The housing cover (35) comprises at least one vent opening (36, 37) for venting the oil chamber (15), which is disposed at a distance from a radial outer region of the housing cover (35) and is fluidically connected to an element (32, 38, 47, 48) for venting the oil chamber (15).

16 Claims, 4 Drawing Sheets

(56) References Cited

U.S. PATENT DOCUMENTS

| | | | |
|---|---|---|---|
| 9,726,057 | B2 | 8/2017 | Yamauchi |
| 10,862,373 | B2 | 12/2020 | Ishikawa et al. |
| 11,137,061 | B2 | 10/2021 | Ishikawa et al. |
| 2006/0219037 | A1 | 10/2006 | Inose et al. |
| 2009/0127954 | A1* | 5/2009 | Mogi ................. F16H 57/0476 310/90 |
| 2012/0312120 | A1 | 12/2012 | Engelmann et al. |
| 2014/0096641 | A1* | 4/2014 | Hoshinoya ......... B60L 15/2054 74/665 L |
| 2019/0128179 | A1 | 5/2019 | Kiyokami et al. |
| 2019/0229582 | A1 | 7/2019 | Ito et al. |
| 2019/0249765 | A1 | 8/2019 | Ito et al. |
| 2019/0285168 | A1 | 9/2019 | Ikeda et al. |
| 2021/0376685 | A1 | 12/2021 | Hacklberger et al. |

FOREIGN PATENT DOCUMENTS

| | | | |
|---|---|---|---|
| DE | 11 2004 000 653 | | 2/2006 |
| DE | 10 2009 018 786 | | 10/2009 |
| DE | 11 2010 003 517 | | 12/2012 |
| DE | 11 2017 003 983 | | 5/2019 |
| DE | 11 2019 002 135 | | 1/2021 |
| DE | 10 2019 122 617 | | 2/2021 |
| EP | 0675302 A1 * | | 10/1995 |
| EP | 2 504 608 | | 10/2012 |
| EP | 2 831 469 | | 2/2015 |
| JP | 2010-137829 | | 6/2010 |
| JP | 2010-142090 | | 6/2010 |
| JP | 2016078465 A * | | 5/2016 |
| JP | 2020174479 A * | | 10/2020 ............... H02K 5/20 |
| WO | 2004/074704 | | 9/2004 |
| WO | 2007/013642 | | 2/2007 |
| WO | 2013/143809 | | 10/2013 |
| WO | 2020/001794 | | 1/2020 |

OTHER PUBLICATIONS

Suzuki, Machine Translation of JP2016078465, May 2016 (Year: 2016).*

Fujimoto, Machine Translation of JP2020174479, Oct. 2020 (Year: 2020).*

Westermaier, Machine Translation of EP0675302, Oct. 1995 (Year: 1995).*

United States Patent and Trademark Office, Office Action issued in U.S. Appl. No. 17/851,342 (Aug. 30, 2023).

United States Patent and Trademark Office, Office Action issued in U.S. Appl. No. 17/855,271 (Oct. 13, 2023).

German Patent Office, Office Action issued in German Patent Application No. 10 2021 207 729.3 (Mar. 28, 2022).

German Patent Office, Office Action issued in German Patent Application No. 10 2021 207 713.7 (Feb. 23, 2022).

German Patent Office, Office Action issued in German Patent Application No. 10 2021 207 731.5 (Mar. 17, 2022).

German Patent Office, Office Action issued in German Patent Application No. 10 2021 207 712.9 (Mar. 28, 2022).

United States Patent and Trademark Office, Office Action issued in U.S. Appl. No. 17/846,792 (Jun. 13, 2024).

* cited by examiner

VENTED ELECTRIC DRIVE UNIT FOR A VEHICLE

RELATED APPLICATIONS

This application claims the benefit of and right of priority under 35 U.S.C. § 119 to German Patent Application no. 10 2021 207 712.9, filed Jul. 20, 2021, the contents of which are incorporated herein by reference in its entirety.

FIELD OF THE DISCLOSURE

The invention relates to a drive unit, in particular an electric drive for a vehicle, comprising a transmission. The invention further relates to a vehicle comprising such a drive unit and to a housing cover of a drive unit.

BACKGROUND

Electric drive units can be designed with a wet-running or a dry-running electric motor and are used in motor vehicles. The drive unit can comprise a gear stage integrated in a housing of the drive unit. To ensure safe operation, the drive unit and, if present, the gear stage have to be lubricated. For this purpose, oil is moved from an oil reservoir through the drive unit with the aid of a pump.

SUMMARY

The oil reservoir can be divided by a partition wall into two oil chambers, which are located near the axial ends of the rotor shaft to receive the oil from actively lubricated bearings. The two oil chambers are separated from one another by a partition wall which comprises an overflow channel, so that oil can flow from one oil chamber to the adjacent one. Having two oil chambers prevents all of the oil from flowing to one end when the drive unit is in a tilted position, for example when traveling uphill, and the movement of the oil is reduced by the partition wall in comparison to there being one large oil chamber. Typically seated on the two ends of the rotor shaft, however, are co-rotating parts that take up too much oil when there is excess oil in the associated oil chamber and feed it into upper portions of the oil chamber, which is undesirable.

Such drive units comprise vents for each oil chamber to provide venting and ventilation to the outside, so that, in the event of a highly uneven oil level or strong temperature variations in the chambers, the pressure in the air region of the oil chamber does not become too high or too low, which would make it at least more difficult to pump the oil out of one of the oil chamber. For this purpose, a vent duct which fluidically connects the air region of the oil chamber to the vent is usually provided in an upper region of the housing of the drive unit; i.e. away from an oil region of the oil chamber.

One disadvantage of such drive units is that venting to the outside via a vent provided for this purpose can be blocked or at least impaired by oil flung around by rotating parts of the drive unit.

The object of the invention is to provide an electric drive unit with improved venting.

This object is achieved by a drive unit comprising a housing, an electric motor disposed inside it, and at least one oil chamber which is disposed in the housing and comprises an oil region and an air region. The oil chamber is provided on an axial end region of the electric motor and is closed off to the outside by a housing cover. The housing cover thus closes the oil chamber in axial direction. It is provided that the housing cover which closes the oil chamber comprises at least one vent opening for venting the oil chamber. The vent opening is disposed at a distance from a radial outer region of the housing cover and is fluidically connected to an element for venting the oil chamber. The vent opening can be configured as a bore in the housing cover, for example.

Such an arrangement of the at least one vent opening in the housing cover which closes the oil chamber in axial direction prevents oil from being flung directly into the vent opening by the rotating rotor shaft of the electric motor or components disposed upon it and blocking said opening. The term "venting" should be understood to mean air equalization in the oil chamber. This air equalization is possible in both directions. The oil chamber can thus be vented by air leaving the oil chamber and ventilated by air entering the oil chamber.

According to one embodiment of the invention, the housing cover comprises at least one connection pipe. The element for venting the oil chamber can be fastened to the connection pipe. The at least one vent opening extends through the connection pipe provided on the housing cover.

The connection pipe can be formed in one piece with the housing cover. The air region of the oil chamber is fluidically connected to the element for venting the oil chamber via the vent opening which extends through the connection pipe. The element for venting the oil chamber leads to the outside.

The connection pipe is preferably configured such that the element for venting the oil chamber can be connected directly to the connection pipe. This can be achieved by a screw connection or a plug connection, for example. The element for venting the oil chamber can be configured as a vent or as a pressure equalization line.

According to a further embodiment of the invention, it is provided that the at least one vent opening opens into the air region of the oil chamber at an angle on an inner side of the housing cover. The vent opening, which opens into the air region of the oil chamber at an angle on the inner side of the housing cover, is oriented counter to a direction in which oil is flung. This prevents oil from being flung directly into the vent opening.

If the vent opening on the inner side of the housing cover is located too far toward the outside, for example in a region of an outer periphery of a component which is disposed on the rotor shaft and rotates with the rotor shaft and is surrounded by the housing cover, oil may be flung into the vent opening by the component disposed on the rotor shaft and block said opening. It is therefore provided that the vent opening is provided in the housing cover radially inside an outer periphery of a component which is disposed on the rotor shaft and rotates with the rotor shaft. The component which is disposed on the rotor shaft and rotates with the rotor shaft can, for example, be configured as an impulse ring that is used to measure the rotation speed. The impulse ring can be surrounded by the housing cover.

With reference to the installed position of the drive unit, the vent opening can open into the air region of the oil chamber on the inner side of the housing cover above an axis of rotation of the rotor shaft.

The vent opening is thus disposed away from oil in the oil region of the oil chamber.

According to one embodiment of the invention, it is provided that the at least one vent opening is protected from the inflow of oil from the oil chamber by a mechanical screen. The screen can, for example, be configured as an air-permeable, oil-tight membrane or as a screen wall on the inner side of the housing cover. The screen wall can have a labyrinthine configuration, for example. The ingress of oil into the vent opening is thus prevented using simple means.

According to a further embodiment of the invention, it is provided that the housing cover comprises at least one second vent opening for venting the oil chamber which is disposed offset to the first vent opening. The second vent opening extends through a second connection pipe provided on the housing cover, to which a further element for venting the oil chamber can be fastened. The second vent opening and the second connection pipe can be configured in the same way as the above-described first vent opening and the above-described first connection pipe. The air region of the oil chamber is consequently likewise fluidically connected to an element for venting the oil chamber via the second vent opening which extends through the second connection pipe. The element for venting the oil chamber then leads to the outside.

Since the first vent opening and the second vent opening are disposed offset to one another, the venting of the oil chamber can be ensured independently of the direction of rotation of the rotor shaft of the electric motor and an associated direction in which oil is flung.

The drive unit can comprise at least one further oil chamber disposed in the housing of the drive unit. This further oil chamber likewise comprises an oil region and an air region. The oil regions of the two oil chambers are preferably fluidically connected to one another via an overflow channel, while the air regions of the two oil chambers are fluidically connected to one another via a pressure equalization channel or a pressure equalization line.

This ensures pressure equalization in both oil chambers. The same pressure always prevails in both oil chambers, whereby only one of the two oil chambers has to be vented. The oil regions of the two oil chambers can be provided on opposite axial end regions of the electric motor. The oil regions can thus be integrated as simply as possible into the housing of the electric drive unit, and the oil regions are disposed close to the locations to which oil is to be delivered and from which oil flows back to the bottom of the oil chamber.

The drive unit can also include a transmission coupled to the electric motor. The transmission can be configured as a planetary transmission and can be disposed in the second oil chamber of the drive unit.

The electric motor is preferably disposed in an engine compartment which is separated from the oil chambers. It is thus possible to use a dry-running electric motor.

The proposed drive unit is used for electrically driving a vehicle. The drive unit therefore comprises an electric motor for providing drive power for the vehicle. The vehicle can be a passenger car or a commercial vehicle. The commercial vehicle can be a truck, a van or a bus, for example.

The housing cover according to the invention is configured as a housing cover of a drive unit, which comprises an electric motor disposed in a housing and at least one oil chamber which is disposed in said housing and comprises an oil region and an air region. The oil chamber is provided on an axial end region of the electric motor and can be closed off to the outside by the housing cover. The housing cover is therefore configured to close the oil chamber of the drive unit in axial direction. It is provided that the housing cover comprises at least one vent opening for venting the oil chamber. The vent opening can be configured as a vent bore, for example.

The housing cover comprises at least one connection pipe. The connection pipe and the housing cover can be configured in one piece. An element for venting the oil chamber can be fastened to the connection pipe. The vent opening which fluidically connects the oil chamber and the vent element extends through the connection pipe provided on the housing cover. The vent opening can open at an angle on an inner side of the housing cover.

According to one embodiment, the housing cover comprises at least one second vent opening for venting the oil chamber which is disposed offset to the first vent opening. This second vent opening extends through a second connection pipe provided on the housing cover, to which a further element for venting the oil chamber can be fastened. The second connection pipe and the housing cover can be configured in one piece. The vent opening can open at an angle on an inner side of the housing cover.

Providing the vent opening and the element for venting the oil chamber on the housing cover makes it possible to produce the housing of the drive unit in a more simple manner. There is then no need for a vent duct which extends in the housing of the drive unit or for a connection on the housing of the drive unit for a vent of the transmission chamber.

According to a further embodiment, the housing cover comprises further connections for connecting further components of the drive unit. It is thus, for example, possible to provide connections for connecting an oil pump, a heat exchanger, a rotation speed sensor and/or a tachometer sensor of the drive unit on the housing cover. Consequently, these connections no longer have to be provided on the housing of the drive unit, which can thus be produced in a more simple manner.

BRIEF DESCRIPTION OF THE DRAWINGS

Further features and advantages of the invention will be apparent from the following description of preferred embodiments with reference to the figures. The figures show.

DETAILED DESCRIPTION

Figure 1:
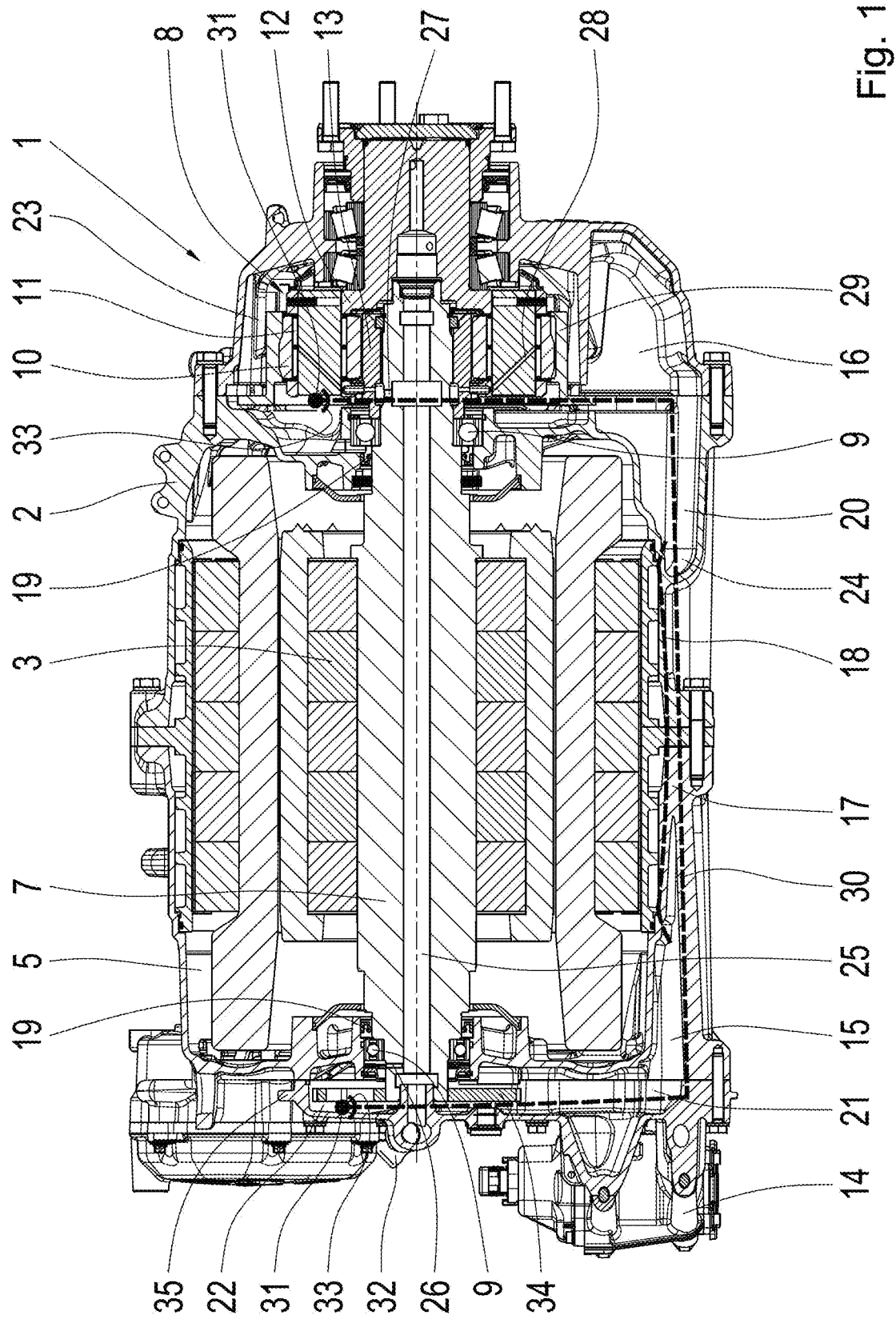
FIG. 1 a sectional view of an embodiment of the drive unit according to the invention, FIG. 2 a front view of an embodiment of the drive unit according to the invention, in which two vents are disposed on the housing cover of the drive unit.

FIG. 1 shows a drive unit 1 according to the invention comprising a housing 2 and an electric motor 3 in a separated and sealed engine compartment 5 disposed in the housing 2. The electric motor 3 can be an induction motor comprising a stator and a rotor, for example.

In the shown design example, the rotor shaft 7 is configured as a hollow shaft. Coupled to the rotor shaft 7 is a transmission 8, which is designed here as a planetary transmission. However, it is also possible to use other types of electric motors and transmissions in the drive unit 1.

The rotor shaft 7 is supported in the housing by means of bearings 9. In the shown design example, the bearings 9 are designed as ball bearings.

The planet gears 10 of the transmission 8 are supported on a planet carrier 12 by means of bearings 11. The bearings 11 of the planet gears 10 in the transmission 8 in this design example, on the other hand, are designed as needle bearings.

The rotor shaft 7 can be driven by the electric motor 3 and, in the shown embodiment, transmits the torque to a sun gear 13 of the transmission 8. The output occurs via the planet carrier 12.

A pump 14 is disposed on the outside of the housing 2. This pump 14 is designed as an oil pump.

Two oil chambers 15, 16 are disposed in the housing 2. Depending on the drive unit, however, it is also possible for there to be more than two oil chambers. These oil chambers 15, 16 are separated from one another by a partition wall 17 and are fluidically connected by a symbolized overflow channel 18. In addition to that, the oil chambers 15, 16 are separated from the engine compartment 5 of the electric motor 3 by means of seals 19.

The oil chambers 15, 16 here are located at the axial end regions of the electric motor 3, where the bearings 9, 11 and the transmission 8 too are disposed. The overflow channel 18 represents a fluidic connection between the oil chambers 15, 16.

The oil chambers 15, 16 each comprise an oil region 20 or 21 which, in the installed state, is at the bottom and an air region 22, 23 located above said oil region.

In the shown design example, the pump 14 draws oil from this oil region 20 of the oil chamber 16 via its own intake duct 24 which starts in the oil chamber 16. The intake duct 24 is a separate channel which is spaced apart from the overflow channel 18 and leads to the pump 14 directly laterally to the oil chamber 15.

The pump 14 moves the oil into a channel 25 inside the rotor shaft 7, which is therefore designed as a hollow shaft. The two oil chambers 15, 16 are additionally connected to one another via this channel 25.

From the channel 25, an opening 26 leads to the bearing 9 in the oil chamber 15, so that the oil is guided to the respective bearing and lubricates and cools it. Oil flowing out of the bearing 9 is then already inside the oil chamber 15 and can flow into its oil region 21.

A further opening 27 is provided on the opposite end of the rotor shaft 7, through which oil can reach both the bearing 9 in the oil chamber 16 and the planet gears 10, and thus also the sun gear 13, as well as, via the openings 28, the bearings 11 of the planet gears 10. The toothing to a ring gear 29 of the planetary transmission is also lubricated with oil.

Here, too, the oil can then flow downward into the oil region 20 inside the oil chamber 16. From there, it is drawn in again by means of the pump 14, so that a circulation is created.

In the embodiment shown in FIG. 1, a pressure equalization channel 30 is provided, which fluidically connects the air regions 22, 23 of the two oil chambers 15, 16 to one another. The pressure equalization channel 30 is shown as a dashed line and extends entirely inside the housing 2. It can therefore be designed as a tube or a hose, for example. If necessary, the tube or the hose can be passed through the overflow channel 18 without limiting its cross-section too much.

The ends and thus the opening sites 31 of the pressure equalization channel 30 open into the air regions 22, 23 of the oil chambers 15, 16 and therefore ensure pressure equalization between the oil chambers 15, 16. The opening sites 31 of the pressure equalization channel 30 are provided with a symbolized mechanical screen 33, which prevents the oil from entering the pressure equalization channel 30. The mechanical screen 33 can, for example, be designed as a membrane which is air-permeable but oil-tight.

Such a membrane can be disposed at the end of the pressure equalization channel 30, for example. Air can thus pass through the pressure equalization channel 30 and ensure pressure equalization, but oil is caught by the membrane.

It is also conceivable that the mechanical screen 33 is configured as a labyrinth-like screen wall. Such a screen wall can be disposed directly at the opening sites 31 of the pressure equalization channel 30, for example, or be part of the wall of the housing 2. The labyrinth-like structure prevents the oil from entering the pressure equalization channel 30, whereas air can pass through such a labyrinth screen and thus provide pressure equalization between the oil chambers 15, 16.

If such a pressure equalization channel 30 is used, there is no need to provide vents for both oil chambers 15, 16. It is thus sufficient if one of the two oil chambers 15, 16 is equipped with a vent 32.

The vent 32 is disposed here on a housing cover 35 of the drive unit 1 and is fluidically connected to the air region 22 of the oil chamber 15 via a vent opening 36 which extends through the housing cover 35 (FIG. 4, FIG. 5), The housing cover 35 is disposed on an axial end region of the drive unit 1 opposite to the output and closes the oil chamber 15 in axial direction. The vent 32 leads to the outside.

The oil chamber 15 is vented via the vent. Since the air regions 22, 23 of the two oil chambers 15, 16 are fluidically connected to one another via the pressure equalization channel 30, the oil chamber 16 provided at the output of the drive unit 1 is also vented via the vent 32 disposed on the housing cover 35.

In the region of the housing cover 35, a component 34 is disposed on the rotor shaft 7, which is connected to the rotor shaft 7 in a rotationally fixed manner. The component is configured here as an impulse ring 34, which is used to measure the rotation speed.

The impulse ring 34 is disc-shaped and is partially surrounded by the housing cover 35.

If the drive unit 1 is installed in a vehicle and the vehicle is on a level surface, the oil chamber 15 has an oil level at which the impulse ring 34 does not project into the oil. However, when the drive unit 1 is in a tilted position, for example when driving uphill, the oil level in the oil chamber 15 can rise and the impulse ring 34 can project into the oil. Depending on the direction in which the drive unit 1 is installed in the vehicle, this can be the case when driving downhill or uphill. Since the impulse ring 34 rotates with the rotor shaft 7, oil is flung radially outward through the impulse ring 34. As a result, splash oil gets into an outer inner region of the housing cover 35. At high rotation speeds of the rotor shaft 7, the splash oil on the outer inner region of the housing cover 35 can create an accumulation of oil in the form of an oil cylinder. A vent opening disposed in this region of the transmission cover 35 or in the housing 2 of the drive unit 1 would be blocked by the splash oil caused by the impulse ring 34. A venting of the oil chamber 15 would then be disrupted.

It is therefore provided according to the present invention that the vent opening 36 is disposed at a distance from the outer inner region of the housing cover 35. The vent opening 36 is thus located at a distance from a radial outer region of the housing cover 35. The vent opening 36 is provided laterally in the housing cover 35.

Such a placement of the at least one vent opening 36 through the housing cover 35 which closes the oil chamber 15 prevents oil from being flung into the vent opening 36 by the rotating impulse ring 34 and blocking it.

Figure 2:
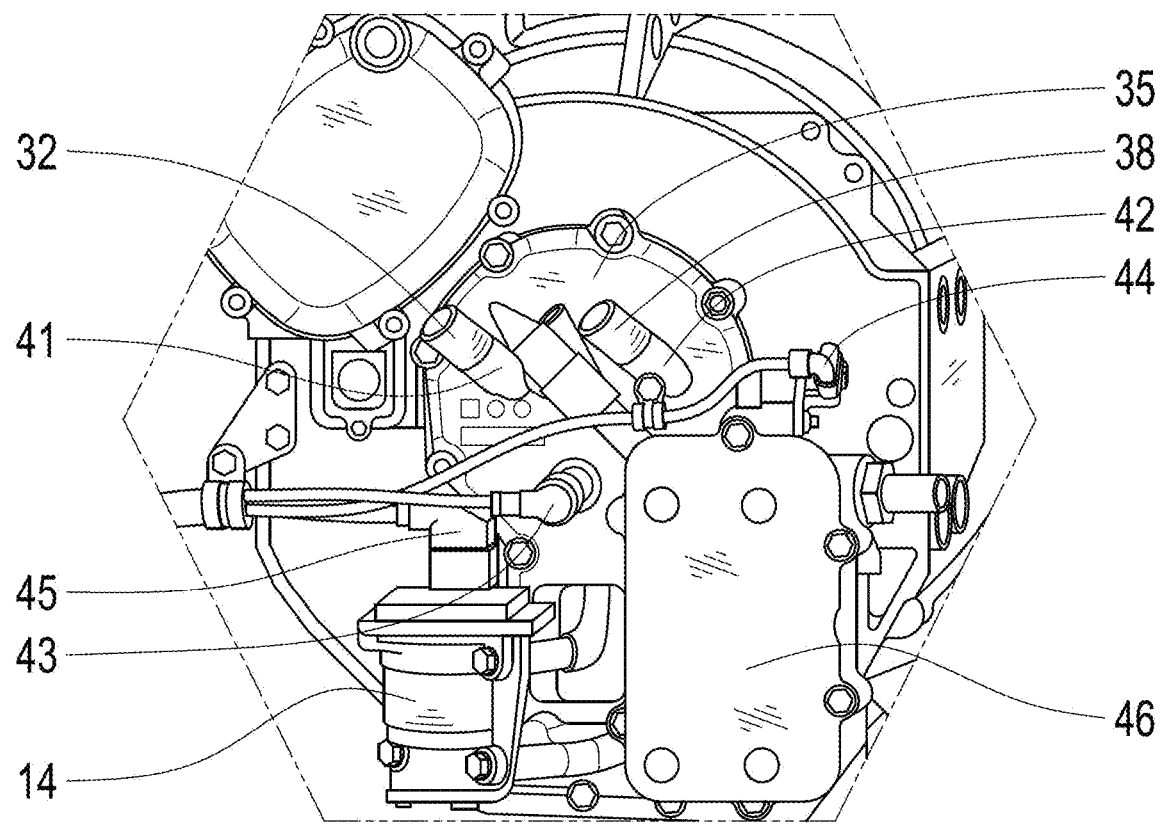

FIG. 2 shows an embodiment of the drive unit 1 in a front view. The vent opening 36 here extends in a connection pipe 41 of the housing cover 35. The connection pipe 42 and the vent opening 36 are provided radially inside an outer periphery of the housing cover 35.

The connection pipe 42 and the vent opening 36 are thus provided radially inside an outer periphery of the of the impulse ring 34 disposed on the rotor shaft 7. The vent opening 36 is also disposed adjacent to an oil inlet 40 (FIG. 5) in the housing cover 35. One end of the oil inlet 40 can be pushed into the rotor shaft 7 so that the oil inlet 50 is fluidically connected to the channel 25 of the rotor shaft 7. This makes it possible to position the vent opening 36 in the housing cover 35 as far away as possible from the radial outer region of the housing cover 35.

This has the advantage that, at this position, it is difficult for the vent opening 36 to be blocked by oil, because the impulse ring 34 flings the oil outward. The oil then collects on the outer inner periphery of the housing cover 35 and flows back into the oil region 21.

According to FIG. 2, a vent 32 for venting the oil chamber 15 is directly connected to the connection pipe 41. The connection can, for example, be implemented via a screw connection using a thread.

In the shown embodiment, the housing cover 35 comprises two vents 32, 38 for venting the oil chamber 15, A second vent opening 37 extends through a second connection pipe 42 which is provided on the housing cover 35 and to which the second vent 38 is connected. This second connection pipe 42 and with it also the vent opening 37 are likewise positioned at a distance from the radial outer region of the housing cover 35.

The two connection pipes 41, 42 and thus also the vent openings 36, 37 which extend through the connection pipes 41, 42 are disposed offset to one another. When the drive unit 1 is in the installed position, the first connection pipe 41 or the first vent opening 36 is disposed in a range from preferably eight to eleven o'clock, whereas the second connection pipe 42 or the second vent opening 37 can be disposed in a range from preferably one to four o'clock. FIG. 2 shows two possible positions for the connection pipes 41, 42 as examples.

This ensures that the venting of the oil chamber 15 is independent of the direction of rotation of the rotor shaft 7 of the electric motor 3. For a clockwise direction of rotation of the rotor shaft 7, the venting of the oil chamber 15 can thus be ensured via the vent opening 37 which extends through the connection pipe 42 and is disposed away from the oil flinging effect. For a counter-clockwise direction of rotation of the rotor shaft 7, on the other hand, the venting of the oil chamber 15 is ensured via the vent opening 36 which extends through the connection pipe 41. The venting of the oil chamber 15 is thus ensured even if splash oil should still enter the region of the vent openings 36, 37 as a result of the rotating rotor shaft 7. The venting is independent of the direction of travel of the vehicle being driven by the drive unit 1.

In the shown embodiment, further components of the drive unit 1 are connected to the housing cover 35. The housing cover 35 comprises connections for connecting the oil pump 14, connections for connecting a heat exchanger 46, a connection for a rotation speed sensor 44 and a connection for a tachometer sensor 43. An electrical plug connection for the oil pump 14 is provided with the reference sign 45.

Figure 3:
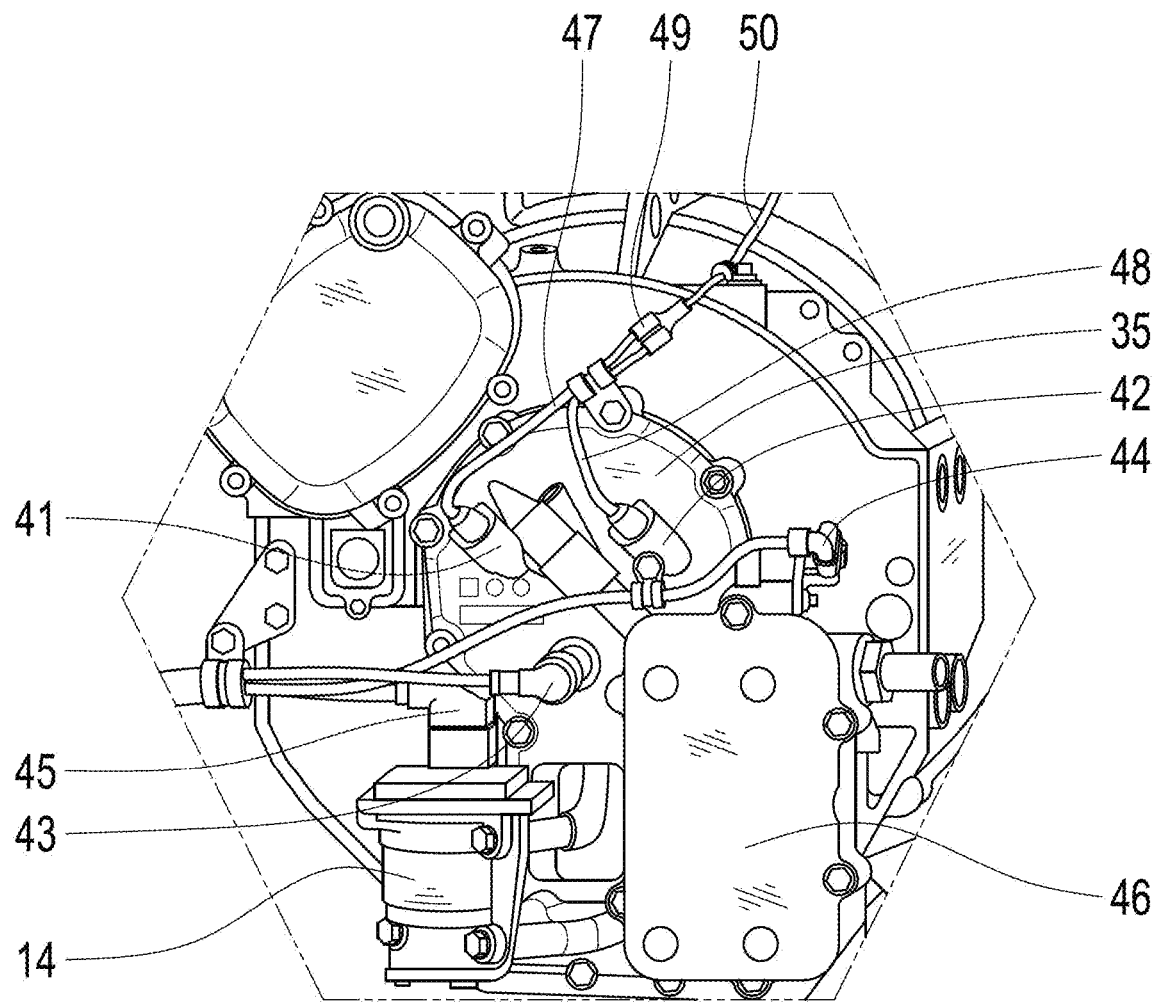
FIG. 3 a front view of an embodiment of the drive unit according to the invention, in which two pressure equalization lines are disposed on the housing cover of the drive unit, FIG. 4 an exterior view of an embodiment of the drive unit housing cover according to the invention, and FIG. 5 an interior view of an embodiment of the drive unit housing cover according to the invention.

FIG. 3 shows a further embodiment of the drive unit 1 in a front view. In contrast to the embodiment according to FIG. 2, here two pressure equalization lines 47, 48 are connected to the connection pipes 41, 42 of the housing cover 35 instead of the two vents 32, 38. The two pressure equalization lines 47, 48 are brought together via a connecting element 49 to form a further pressure equalization line 50. The pressure equalization lines 47, 48, 50 are routed outside the housing 2 of the drive unit 1.

The pressure equalization line 50 can open into the air region 23 of the oil chamber 16, for example, and connect the two air regions 22, 23 of the oil chambers 15, 16 to one another. There is then no need for the pressure equalization channel 30 inside the housing 2 of the drive unit 1.

The oil chambers 15, 16 can then be vented via a vent provided on the oil chamber 16, for example, or via a vent disposed on the pressure equalization line 50.

Figure 4:
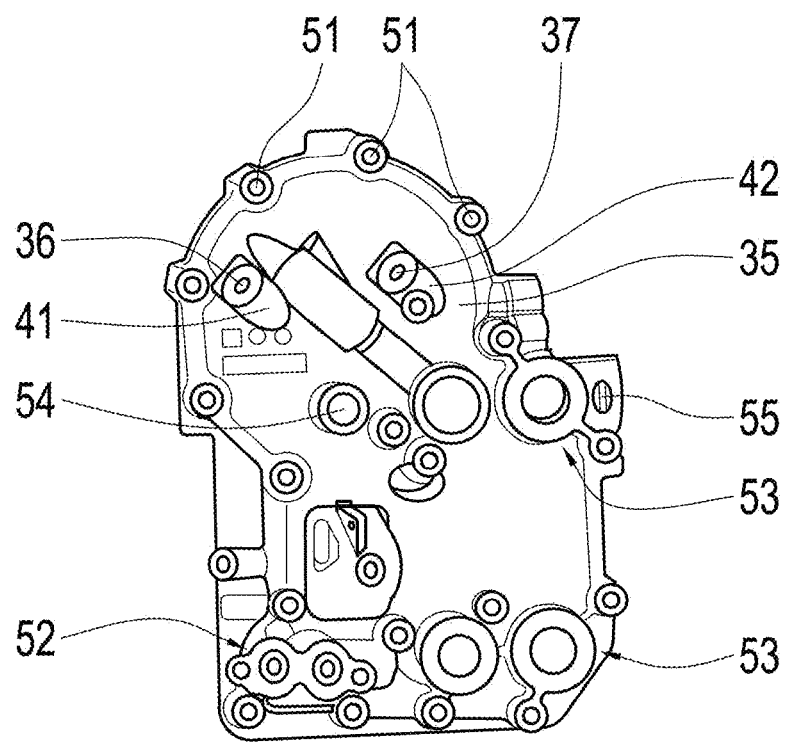

FIG. 4 shows an exterior view of the housing cover 35 of the drive unit 1. The housing cover 35 comprises the connection pipes 41, 42, to each of which an element 32, 38, 47, 48 for venting an oil chamber 15 of the drive unit can be connected. The vent openings 36, 37, via which the element 32, 38, 47, 48 for venting an oil chamber 15 is fluidically connected to the air region 22 of the oil chamber, extend through the connection pipes 41, 42. The housing cover 35 also comprises a plurality of mounting bores 51 distributed around the periphery of the housing cover 35, for mounting the housing cover 35 on the housing 2 of the drive unit 1. Connections 52 for connecting the oil pump 14, connections 53 for connecting the heat exchanger 46, a connection 55 for the rotation speed sensor 44 and a connection 54 for the tachometer sensor 43 of the drive unit 1 are provided on the housing cover 35 as well.

Figure 5:
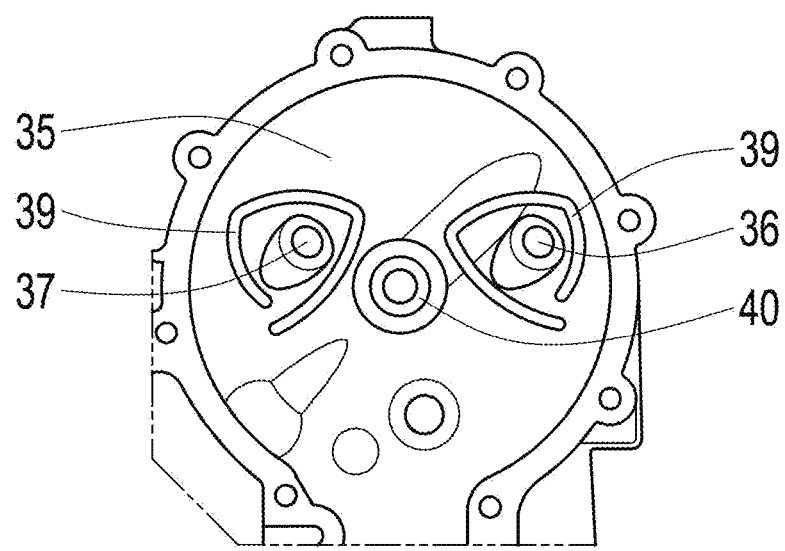

FIG. 5 shows part of an interior view of the housing cover 35 of the drive unit 1. The vent openings 36, 37 are provided with a symbolized mechanical screen 39, which prevents splash oil from entering the vent openings 36, 37. The mechanical screen 39 is configured as a screen wall. The screen wall surrounds the opening region of the vent openings 36, 37. The screen wall can be configured as ribbing on the inner side of the housing cover 35, for example. The opening region of the vent openings 36, 37 is oriented counter to an oil flinging effect of the impulse ring 34, as a result of which oil cannot be flung directly through the vent openings 36, 37. The vent openings 36, 37 open at an angle on an inner side of the housing cover 35.

The housing cover 35 also comprises an oil inlet 40. One end of the oil inlet 40 can be pushed into the rotor shaft 7, so that the oil inlet 40 is fluidically connected to the channel 25 of the rotor shaft 7. The oil inlet 40 does not rotate with the rotor shaft 7, however, the vent openings 36, 37 open on the inner side of the housing cover 35 above the oil inlet 40 and thus above the axis of rotation of the rotor shaft 7.

LIST OF REFERENCE NUMERALS

1 Drive unit
2 Housing
3 Electric motor
5 Motor compartment
7 Rotor shaft
8 Transmission
9 Bearing
10 Planet gears
11 Bearing
12 Planet carrier
13 Sun gear 14 Pump
15 Oil chamber
16 Oil chamber
17 Partition wall
18 Overflow channel
19 Seals
20 Oil region
21 Oil region
22 Air regions
23 Air region
24 Intake duct
25 Channel
26 Opening
27 Opening
28 Opening
29 Ring gear
30 Pressure equalization channel
31 Opening sites
32 Vent
33 Screen
34 Impulse ring
35 Housing cover
36 Vent opening
37 Vent opening
38 Vent
39 Screen
40 Oil inlet
41 Connection pipe
42 Connection pipe
43 Tachometer sensor
44 Rotation speed sensor
45 electrical connection
46 Heat exchanger
47 Pressure equalization line
48 Pressure equalization line
49 Connecting element
50 Pressure equalization line
51 Mounting bores
52-55 Component connections

The invention claimed is:

1. A drive unit comprising: a housing, an electric motor that defines a rotational axis and is radially enclosed inside the housing, a radially extending housing cover having axially opposite interior and exterior faces that extend radially, a radially outer region of the housing cover is connected to an axial end of the housing, at least one oil chamber disposed in the housing on an axial end region of the electric motor, the interior face of the housing cover defines an axial extent of the oil chamber remote from the electric motor, the oil chamber comprises an oil region and an air region and is closed off to the outside by the housing cover, and wherein the housing cover comprises at least one vent opening that extends axially through the housing cover from the interior face to the exterior face for venting the oil chamber, the at least one vent opening is disposed at a distance from the radial outer region of the housing cover and fluidically connected to an element for venting the oil chamber,
  wherein the at least one vent opening opens into the air region of the oil chamber at a n on-perpendicular angle relative to the interior face of the housing cover, and
  wherein the electric motor has a rotor shaft that rotates about the rotational axis, the rotor shaft axially extends into the oil chamber and has an end that supports a component of the drive unit within the oil chamber adjacent the interior face of the housing cover, the component extends radially within the oil chamber and has an outer periphery, the at least one vent opening is located on the inner side of the housing cover at a radial distance from the rotational axis that is shorter than a radial distance of the outer periphery of the component from the rotational axis.

2. The drive unit according to claim 1, wherein the at least one vent opening extends axially from the interior face to the exterior face through the housing cover and a connection pipe which is provided on the exterior face of the housing cover and to which the element for venting the oil chamber is fastened.

3. The drive unit according to claim 1, wherein the at least one vent opening which opens on an inner side of the housing cover is oriented counter to a direction in which oil is flung.

4. The drive unit according to claim 1, wherein the at least one vent opening opens into the air region of the at least one oil chamber on an inner side of the housing cover above the rotational axis.

5. The drive unit according to claim 1, wherein the interior face of the housing cover has a mechanical screen that surrounds the at least one vent opening such that the at least one vent opening is protected from an inflow of oil from the at least one oil chamber.

6. The drive unit according to claim 5, wherein the mechanical screen is configured as an air-permeable, oil-tight membrane or as a screen wall on the interior face of the housing cover.

7. The drive unit according to claim 2, wherein the housing cover comprises at least one second vent opening for venting the at least one oil chamber, the at least one second vent opening is disposed offset to the first vent opening and extends axially from the interior face to the exterior face through the housing cover and a second connection pipe provided on the exterior face of the housing cover and to which a further element for venting the oil chamber is fastened.

8. The drive unit according to claim 1, wherein the element for venting the oil chamber is configured as a vent or as a pressure equalization line.

9. The drive unit according to claim 1, wherein the drive unit comprises at least one further oil chamber which is disposed in the housing and comprises a further oil region and a further air region, wherein the oil region and the further oil region are fluidically connected via an overflow channel and the air region and the further air region are fluidically connected via a pressure equalization channel or a pressure equalization line.

10. The drive unit according to claim 9, wherein the at least one oil chamber and the at least one further oil chamber are provided on opposite axial end regions of the electric motor.

11. A vehicle comprising a drive unit according to claim 1.

12. A housing cover of a drive unit comprising an electric motor that defines a rotational axis and is radially enclosed in a housing and at least one oil chamber disposed in said housing and comprises an oil region and an air region, wherein the housing cover has axially opposite interior and exterior faces that extend radially, the housing cover is fixed to an axial end of the housing such that the interior face defines an axial extent of the at least one oil chamber remote from the electric motor, the at least one oil chamber is closed to the outside by the housing cover, wherein the housing cover comprises at least one vent opening that extends axially through the housing cover from the interior face to the exterior face for venting the at least one oil chamber, wherein that at least one vent opening opens into the air region of the oil chamber at a non-perpendicular angle relative to the interior face of the housing cover, and wherein the electric motor has a rotor shaft th at ro about th rotational axis, the rotor shaft axially extends into the oil chamber and has an end that supports a component of the drive unit within the oil chamber adjacent the interior face of the housing cover, the component extends radially within the oil chamber and has an outer periphery, the at least one vent opening is located on the inner side of the housing cover a a radial distance from the rotational axis that is shorter than a radial distance of the outer periphery of the component from the rotational axis.

13. The housing cover according to claim 12, further comprising a connection pipe that extends axially from the exterior face of the housing cover at a non-perpendicular angle relative to the exterior face, an element being fastened to a remote end of the connection pipe for venting the oil chamber.

14. The housing cover according to claim 13, wherein the housing cover comprises at least one second vent opening for venting the oil chamber, wherein the at least one second vent opening is disposed offset to the at least one vent opening and extends from the interior face to the exterior face through the housing cover and a second connection pipe that extends axially from the exterior face of the housing cover at a non-perpendicular angle relative to the exterior face of the housing cover, a further element being fastened to the second connection pipe for venting the oil chamber.

15. The housing cover according to claim 12, further comprising an oil inlet that is coaxial with the rotor shaft for conducting oil.

16. The housing cover according to claim 15, wherein the housing cover comprises further connections for connecting further components of the drive unit.

* * * * *